US009638513B2

(12) United States Patent
Rembe (10) Patent No.: US 9,638,513 B2
(45) Date of Patent: May 2, 2017

(54) DEVICE AND METHOD FOR THE INTERFEROMETRIC MEASURING OF AN OBJECT (71) Applicant: Polytec Gmbh, Waldbronn (DE)

(72) Inventor: Christian Rembe, Waldbronn (DE)

(73) Assignee: Polytec GmbH, Waldbronn (DE)

( * ) Notice: Subject to any disclaimer, the term of this patent is extended or adjusted under 35 U.S.C. 154(b) by 0 days.

(21) Appl. No.: 14/604,849

(22) Filed: Jan. 26, 2015

(65) Prior Publication Data
US 2015/0211841 A1 Jul. 30, 2015

(30) Foreign Application Priority Data

Jan. 24, 2014 (DE) .......................... 10 2014 201 274

(51) Int. Cl.
*G01B 9/02* (2006.01)
*G01B 11/14* (2006.01)
(Continued)

(52) U.S. Cl.
CPC .......... *G01B 11/14* (2013.01); *G01B 9/02005* (2013.01); *G01B 9/02025* (2013.01);
(Continued)

(58) Field of Classification Search
CPC ............ G01B 9/02025; G01B 9/02027; G01B 9/2028; G01B 2290/25
(Continued)

(56) References Cited

U.S. PATENT DOCUMENTS 5,412,474 A 5/1995 Reasenberg et al.
5,504,571 A 4/1996 Eckerman et al.
(Continued)

FOREIGN PATENT DOCUMENTS

DE 4344499 7/1995
DE 102007010387 9/2008
(Continued)

OTHER PUBLICATIONS

Breitenbach, Gerd: "Quantum State Reconstruction of Classical and Nonclassical Light and a Cryogenic Opto-Mechanical Sensor for High-Precision Interferometry", Konstanz, 1998. 141 S.-Konstanz, Univ., Diss, 1998.
(Continued)

*Primary Examiner* — Jonathan Hansen
(74) *Attorney, Agent, or Firm* — Volpe and Koenig, P.C.

(57) ABSTRACT

A device for the interferometric measuring of an object, including a radiation source for generating an output beam, at least one beam splitter, as well as at least one detector, with the beam splitter being arranged in the radiation path of the output beam such that the output beam is split into at least one measuring beam and one reference beam, and the device is embodied to interfere the reference beam on the detector with an interference beam to form an optic interference. The device has an open optic resonator, which is arranged in the radiation path of the device such that the measuring beam enters the open optic resonator and the interference beam emitted from the open optic resonator is interfered with a reference beam on the detector to form an optic interference. The invention further relates to a method for the interferometric measuring of an object.

20 Claims, 2 Drawing Sheets (51) Int. Cl.
*G01B 11/06* (2006.01)
*G01P 3/36* (2006.01)
*G01Q 20/02* (2010.01)

(52) U.S. Cl.
CPC ..... *G01B 9/02038* (2013.01); *G01B 9/02049* (2013.01); *G01B 11/0608* (2013.01); *G01P 3/36* (2013.01); *G01Q 20/02* (2013.01); *G01B 2290/25* (2013.01)

(58) Field of Classification Search
USPC .................................. 356/506, 519, 511–515
See application file for complete search history.

(56) References Cited

U.S. PATENT DOCUMENTS

| | | | |
|---|---|---|---|
| 5,565,987 A * | 10/1996 | Jain | G01B 7/34 356/501 |
| 5,715,054 A | 2/1998 | Saurenbach et al. | |
| 6,713,743 B2 | 3/2004 | Kim et al. | |
| 7,319,527 B2 | 1/2008 | Frederix et al. | |
| 7,492,469 B2 * | 2/2009 | De Groot | G01B 11/2441 356/512 |
| 8,115,933 B2 | 2/2012 | Rembe et al. | |
| 8,570,529 B2 | 10/2013 | Karrai | |
| 2014/0041456 A1 | 2/2014 | Rembe et al. | |

FOREIGN PATENT DOCUMENTS

| | | |
|---|---|---|
| DE | 102011100252 | 11/2012 |
| WO | 2009043421 | 4/2009 |

OTHER PUBLICATIONS

Payton, O.D. et al.: "Experimental Observation of Contact Mode Cantilever Dynamics with Nanosecond Resolution" Review of Scientific Instruments 82, 043704 (2011); online: http://dx.doi.org/10.1063/1.3575321.

* cited by examiner

DEVICE AND METHOD FOR THE INTERFEROMETRIC MEASURING OF AN OBJECT

INCORPORATION BY REFERENCE

The following documents are incorporated herein by reference as if fully set forth: German Patent Application No. 102014201274.0, filed Jan. 24, 2014.

BACKGROUND

The invention relates to a device for the interferometric measuring of an object as well as a method for the interferometric measuring of an object and a use of a device for the interferometric measuring of an object.

Devices for the interferometric measuring of an object comprise typically a radiation source for generating an output beam, an optic interferometer, as well as a defector. The interferometer is arranged in the radiation path of the output beam and an interference beam is generated by the interferometer, with the detector being arranged in the radiation path of the interference beam.

By evaluating the measuring signal of the detector, for example a conclusion can be drawn about a speed of motion of the surface of the object to be measured. In particular when such a device is embodied for the measuring of the oscillation speed and/or the time-dependent speed and/or path signal of an object this is commonly called a vibrometer.

In such devices it is essential that the Doppler-effect is utilized: The output beam is guided to the object and the beam, at least partially reflected or redistributed, shows a frequency shift based on the motion of the object, which forms the Doppler-effect.

By forming interference and receiving interference signals via the detector the above-mentioned frequency shift is transferred into a frequency range, which can be measured with sufficient precision by optic detectors, such as photodetectors.

Typical devices of prior art for the interferometric measuring of an object comprise an interferometer, which is generally designed based on the two-beam principle. For example, the interferometer may be designed as a Michelson-interferometer, frequently however a Mach-Zehnder-interferometer is realized: The output beam is split via a beam splitter into a measuring beam and a reference beam. The measuring beam is guided to the object and the measuring beam, at least partially reflected or disbursed, is at least partially coupled back into the radiation path of the interferometer and interfered together with the reference beam on the detector, so that in this case the measuring beam and the reference beam, interfered on the detector, represent the interference beam, which its interference signal being measured by the detector.

The above-mentioned devices for the interferometric measurement of an object are also used, in addition to determining the speed of motion, also to determine the direction of motion of the object (typically in a heterodyne embodiment). It is also known to embody the devices as scanning devices, so that respective measurement data is provided for a plurality of measuring points on the object and thus, for example, also data regarding the topography of the object can be determined.

The maximally achievable precision of measurement of such devices, for example the minimally achievable amplitude resolution, is limited by the shot signal noise current, among other things. In devices for the interferometric measurement of an object, with its precision being at or near the limit set thereby, is also called shot signal noise—limited light detection.

SUMMARY

The invention is based on the objective to provide a method for a device of an interferometric measurement of an object, which allows a higher measurement precision in reference to methods and devices of prior art, preferably a better amplitude resolution.

This objective is attained in a device for the interferometric measuring of an object, a method for the interferometric measuring of an object, as well as an application according to one or more features provided herein. Preferred embodiments of the device, method, and application according to the invention are described below and in the claims. The wording of all claims is explicitly included in the description by way of reference.

The device according to the invention is preferably embodied by implementing the method according to the invention and/or a preferred embodiment thereof. The method according to the invention is preferably embodied to be implemented by a device according to the invention and/or a preferred embodiment thereof.

The device according to the invention for the interferometric measuring of an object comprises a radiation source to generate an output beam, at least one beam splitter, as well as at least one detector. The beam splitter is arranged in the beam path of the output beam such that the output beam is split into at least one measuring beam and one reference beam. Furthermore, the device is embodied such that it interferes the reference beam with an interference beam on the detector in order to form an optic interference.

With regards to this basic design, the device according to the invention is equivalent to devices of prior art for the interferometric measuring of objects.

It is essential that the device according to the invention comprises an optically open resonator. The optically open resonator is arranged in the radiation path of the device such that the measuring beam enters into the open optic resonator and on the detector is interfered with an interference beam emitted by the open optic resonator, in order to form an optic interference.

The device according to the invention therefore differs essentially from the devices of prior art for the interferometric measurement of an object by a two-beam interferometer being combined with an open optic resonator.

The measuring beam of the two-beam interferometer impinges the optically open resonator and the beam emitted by the open optic resonator is interfered as an interference beam with the reference beam of the two-beam interferometer on the detector in order to form an optic interference.

By the cooperation of the optically open resonator and the object to be measured here an optic resonator forms, by which the above-described interference beam is generated.

The invention is based on the acknowledgement of the inventor that by a change of the devices of prior art the above-mentioned limitation, caused by the shot signal noise, can be changed only to an irrelevant extent or not at all in order to yield a higher resolution of measurement. This particularly applies when the emitted light and the wavelength of the output beam generated by the radiation source cannot be selected arbitrarily, because e.g., the noise behavior of the laser, the power limit of the detector, and the sensitivity of the measuring object limit the potential power of the measuring light or it is desired to predetermine the wavelength of the output beam. Thus, when the wavelength of the output beam is not available as a parameter for optimization, the limit of the precision of the measurement caused by shot signal noise can at best be yielded by preparing particular photon conditions, i.e. using very expensive and cost-intensive apparatuses. Furthermore, it is questionable if even this way any considerable increase of the precision of measurement could be yielded, because particularly any already suffered loss in light intensity would again reduce the precision of measurement.

The invention is now based in particular on the acknowledgment of the inventor that in the interferometric measurement a so-called phase-discriminator, which is defined by the flank of an interference strip, is relevant as an additional parameter for the precision of measurement: The gradient of the phase discriminator, this means its pitch, is also a parameter for the resolution of measurement.

When now an optic resonator is used for generating the interference beam, in which as described above the interferometer is embodied as an open optic resonator so that in cooperation with the object to be measured an optic resonator can be formed, a higher phase discriminator pitch is yielded when the correct resonator reflectivity is selected.

By the combination of the two-beam interferometer with the open optic resonator, via the measuring signals of the detector, the amplitude of the electric field vector of the measuring and interference beams interfered on the detector can be determined. Preferably this determination occurs in a manner known per se via demodulation of the measuring signals, particularly using ARCTAN-demodulation, known per se. It is also within the scope of the present invention to use other evaluation and/or demodulation methods or prior art.

The combination of a two-beam interferometer with an optically open resonator allows the determination, particularly from the measuring signals of the detector, of the amplitude and/or the phase, particularly the amplitude and the phase of an electric field vector of the measuring and reference beams interfered on the detector. When determining the phase it is particularly advantageous to determine the control of the operating point depending on an appropriate curve, in which the phase is applied over the control parameter. In particular, here advantageously an inflection point of this curve can be selected as the operating point.

The present invention therefore implements for the first time the principle to form an optic resonator, by using an open optic resonator with an object, used in the function as a resonator reflector, in order to form an optic resonator similar to a Fabry-Perot interferometer.

The present invention is characterized in another aspect by the use of an open optic resonator for the optic interferometric measuring of an object, by the object being arranged such that the open optic resonator and the object form an optic resonator, preferably similar to a Fabry-Perot interferometer.

The principle physical ability for implementation of the device according to the invention and the method according to the invention has already been proven by university research. For example, test designs are known regarding the investigation of the quantum-mechanical features of light in which an optic resonator is modified by embodying a reflector of the resonator as an oscillating reflector. For example, such a design is described in *Breitenbach, Gerd; "Quantum state reconstruction of classical and non-classical light and a cryogenic opto-mechanical sensor for high-precision interferometry", Dissertation, University Konstanz, June* 1998 particularly in chapter 6, FIG. 6.12 and the corresponding description. However, here no regulation of the operating point is provided, and the oscillating reflector is a part of the overall structure, for example by the reflector being arranged with the second, not oscillating reflector in a joint LHe-cryostat. The device according to the invention and the method according to the invention can be used however, like vibrometers known from prior art, for objects separated from the device; in particular the device according to the invention can be preferably implemented as a separate measuring unit to be arranged at measuring objects or equipped with a separate fastening for measuring objects.

The method according to the invention for the interferometric measurement of an object comprises the following processing steps:

generating an output beam via a light source;
splitting the output beam into at least one measuring beam and one reference beam;
interfering the reference beam and an interference beam on a detector in order to form an optic interference.

It is essential that the measuring beam enters into an open optic resonator, that an optic resonance is formed between the open optic resonator and the object to be measured, and that the interference beam emitted from the open optic resonator is interfered with the reference beam on the detector in order to form an optic interference.

This leads to the advantages of the device according to the invention described above.

Advantageously the interferometer of the device according to the invention comprises an optic resonator reflector, which is arranged in the radiation path of the output beam. Here, it is within the scope of the invention to use resonator reflectors known per se for Fabry-Perot interferometers.

The resonator reflector preferably comprises a surface at the side facing towards the object having the form of a partial spherical area. The radius of this partial spherical area is preferably equivalent to the distance of the resonator reflector from the surface of the object to be measured. Preferably the distance between the resonator reflector and the surface of the object to be measured are kept approximately constant via a control of the operating point.

In a preferred embodiment of the device according to the invention the interferometer comprises a second beam splitter, which is arranged in the radiation path of the output beam between the radiation source and the resonator reflector. The beam splitter is embodied such that an interference beam emitted by the resonator reflector is deflected by the beam splitter out of the radiation axis of the output beam.

This way it is possible in a simply designed and cost-effective fashion, on the one hand to achieve a coupling of the output beam into the optic resonator and on the other hand to display the interference beam, emitted from the optic resonator, via the beam splitter on the detector.

Here it is particularly advantageous that the beam splitter is embodied as a polarization beam splitter and that an optic polarization device is arranged in the radiation path of the output beam and/or the interference beam, preferably a $\lambda/4$-platelet. In particular it is advantageous that the polarization device is arranged in the radiation path of the interference beam between the polarization beam splitter and the resonator reflector.

This way, by utilizing components of prior art, such as polarization beam splitters and $\lambda/4$-platelets, the above-described advantageous function of displaying the interference beam on the detector can be achieved with hardly any loss in intensity.

Preferably the interferometer comprises a sliding device for displacing the resonator reflector in reference to the object. The displacement occurs here preferably parallel in reference to the axis of the beams in the radiation paths in the optic resonator. In particular, it is advantageous that the shifting device comprises at least one Piezo-element for displacing the resonator reflector. This way, a cost-effective and extremely precise displacement can be achieved.

The displacement of the resonator reflector allows in particular to influence the optic path length of the resonator, in order to keep constant the operating point of the interferometer. Preferably the optic path length is kept approximately constant.

Thus, with the device according to the invention for the first time an increase of the measuring precision is possible, particularly a lower limit of resolution with regards to the amplitude resolution.

Examinations of the applicant have shown that a suitable selection of the reflection ratio of the optic reflectivity of the optic resonator in reference to the optic reflectivity of the measured surface of the object has additional advantageous effects for a low resolution limit. Preferably, the open optic resonator therefore shows an optic reflectivity which is greater than the optic reflectivity of the sample. In particular, it is advantageous that the optic reflectivity of the resonator is greater by 2% to 20% than the optic reflectivity of the surface of the object to be measured.

A particularly advantageous embodiment is yielded by the open optic resonator being embodied with an adjustable optic reflectivity. This way adjustment, either manually by the user or automatically by an appropriately embodied control device, of the reflectivity of the optic resonator can be made such that an optimal resolution results in cooperation with the optic reflectivity of the surface of the object to be measured.

In particular, preferably the open optic resonator is embodied with an adjustable optic reflectivity, at least in the range of the wavelength of the measuring beam, (which is) preferably greater and maximally twice the size (200%) of the reflectivity of the measuring surface, with the preferred range being up to 10% above the reflectivity of the measuring surface (particularly preferred the reflectivity of the resonator is therefore in the range of the wavelength of the measuring beam (and) greater than the reflectivity of the measuring surface, however amounting to maximally 110% of the reflectivity of the measuring surface).

It is particularly advantageous for the open optic resonator to comprise a resonator reflector, with its optic reflectivity being embodied adjustable in reference to the object, at least in the range of the wavelength of the measuring beam. The reflectivity can be adjusted by selecting e.g., a mirror with wavelength-dependent reflectivity and a wavelength-adjustable laser. The change of the wavelength must however be of such low extent that the change in reflectivity of the measuring object can be neglected. At a constant wavelength the reflectivity can be varied by the reference reflector itself comprising several reflective layers, with it being possible to vary the distance.

For the device according to the invention the two-beam interferometer is preferably embodied as a Mach-Zehnder interferometer. However, the embodiment of the interferometer as a Michelsen interferometer is also within the scope of the invention.

In another preferred embodiment the device comprises a control of the operating point for the interferometer. This is based on the acknowledgment of the inventor that sufficient measuring precision further requires a control of the operating point of the interferometer. The term "operating point" is known per se in the context with interferometers and may be defined as a point on a curve progression, when the intensity of the detector signal is applied over the parameter influenced by the control of the operating point. This influenced parameter may represent for example the optic wavelength of the optic resonator. Alternatively or additionally, for example the wavelength of the output beam may be selected as the parameter influenced by the control of the operating point. It is known for example to select as the operating point a point on a flank of the above-mentioned intensity curve, for example a mean point (e.g., an inflection point of the curve). It is also known to select a maximum of the above-mentioned intensity curve as the operating point.

It is essential that a control of the operating point of the interferometer occurs, because this is essential for a sufficient measuring precision according to the acknowledgment of the applicant.

The control of the operating point is preferably embodied to control the operating point of the interferometer depending on the measuring signals of the detector. It is also within the scope of the invention to control the operating point depending on a second detector, which is also arranged via additional beam splitters in the radiation path of the interferometer. However, here an expensively constructed and costly design is necessary, so that it is advantageous to use only one detector for signal processing with regards to the desired measuring data and for the control of the operating point.

Preferably the control of the operating point includes a frequency switch and in particular is here preferably embodied such that the operating point is controlled depending on low-frequency portions of the measuring signals of the detector. This represents a robust and simply designed control mechanism for the operating point.

The design of the frequency range essentially depends on the object to be measured and here particularly on the desired width of the control band of the control of the operating point. For example, if a spinning object is measured and for example all wavelengths shall be controlled of 1/10 of the circumference along the measuring curve, the width of the control band must amount to approximately 1000 Hz at a rotational speed of 6000 rpm, for example. The selection of the frequency switch and the definition of the high-frequency signals and the low-frequency signals are therefore essentially dependent on the range of application. The low-frequency signals are therefore used to control the operating point and the high-frequency signals as measuring data in order to determine the desired measuring parameter, such as oscillating data of the object.

Preferably, the control of the operating point additionally comprises a control amplifier, which is connected to the low-frequency output of the frequency switch. This way, in a simple design, a transfer of the low-frequency signals of the detector can occur directly to the respective control mechanism. This control mechanism may represent, for example, a displacement unit for displacing the resonator reflector, as described above, so that the control of the operating point occurs by controlling the optic path length of the resonator. The scope of the invention also includes to control the wavelength of the output beam depending on the low-frequency signals of the detector, for example by the use of an adjustable laser.

It is particularly advantageous if an off-set is interposed between the frequency switch and the control amplifier so that by a simple predetermination of a base level here an adjustment can occur.

With regards to the application and evaluation of the measuring signals of the detector it is within the scope of the invention to embody the device according to the invention similar to devices of prior art, and particularly preferred as a vibrometer. It is therefore within the scope of the invention that the device comprises an evaluation unit for assessing the measuring signals of the detector, which evaluation unit is embodied in order to determine the speed of motion of the object and/or the surface of the object and/or the topography of the object from the measuring signals of the detector. In particular, it is advantageous that via the measuring signals of the detector at least the amplitude of the electric vector of the interference beam is evaluated.

It is also within the scope of the invention to embody the device as a scanning device in a manner known per se, so that a plurality of locally different measuring points on the object can be measured.

The measuring of a topography via an interferometer is known per se and described for example in U.S. Pat. No. 5,504,571.

Another expansion of the evaluation possibilities of the measuring signals of the detector results from the above-mentioned two-beam interferometer being embodied as a heterodyne interferometer. Preferably for this purpose the two-beam interferometer comprises a frequency shift unit, which is arranged in the radiation path of the reference beam or the interference beam. The frequency shift unit is preferably embodied as a Bragg-cell, known per se.

By the heterodyne design, for example based on the frequency off-set between the measuring beam and the reference beam caused by the frequency shift unit, additionally conclusions can be drawn regarding the direction of motion of the object and/or the surface of the object in reference to the device.

Particularly good measuring results are achieved when at a wavelength of the output beam the object shows a reflection greater than 0.1%, preferably greater than 1%, further preferred greater than 10%, and particularly preferred greater than 50%.

The resonator reflector may be embodied in a manner known per se. In particular the use of a coated carrier substrate is advantageous, with the coating preferably being embodied by vapor deposition. In particular the use of a dielectric coating is advantageous, in which the reflection characteristics can be predetermined by the design of the layers. The coating may also be embodied from a metallic layer, such as gold or silver, for example, when the reflective features on the measuring object are respectively beneficial. The resonator reflector is preferably embodied with a reflection from 10% to 150%, preferably from 100% to 110%, further preferred from 100% to 101% of the reflectivity of the measuring surface.

As described above, the principle design and particularly the individual optic components used may be selected in a device according to the invention and when implementing the method according to the invention similar to devices of prior art and particularly vibrometers of prior art.

In particular, preferably a radiation source is used for generating a monochromatic output beam, particularly a laser. Depending on the range of wavelengths of the oscillations to be measured different lasers may be used, for example a DPSS-laser device. Typical wavelengths of the output beam are 532 nm, 632.8 nm, or 1550 nm.

A particularly advantageous application occurs in connection with a scanning force microscope (atomic force microscope): Preferably the device is embodied as a scanning force microscope and embodied for accepting a measuring tip, so that a surface of the measuring tip directly or indirectly embodies an optic resonator together with the open optic resonator of the device.

This preferred embodiment is based on the acknowledgment that the device according to the invention is suitable for forming a microscope with a resolution previously unachievable.

The increase in the precision of measurement of the device according to the invention can be applied preferably for measuring the motion of the surface of a measuring tip of a scanning force microscope. This way, the motion of the measuring tip can be measured with a previously unachieved precision and thus conclusions can be drawn with a previously unachievable precision about the surface condition of an object measured via the measuring tip of the scanning force microscope. For this purpose the open optic resonator of the device, together with the surface of the measuring tip, directly or indirectly forms the optic resonator. In this preferred embodiment the measuring beam therefore is not directly impinging the object to be measured. Rather the measuring needle (in typical embodiments also called "cantilever") is interposed between the measuring beam and the object. Using the measuring needle the surface is scanned in a manner known per se and, unlike scanning force microscopes of prior art, the motion of the measuring needle is measured via the measuring beam, as described above, particularly in a direction perpendicular in reference to the extension of the surface of the object to be measured.

For this purpose, the measuring beam can directly impinge the measuring needle, preferably at a side of the measuring needle facing away from the object to be measured. The scope of the invention also includes to interpose additional components, particularly to arrange a reflective surface on the measuring needle, impinged by the measuring beam.

The above-described preferred embodiment furthermore exhibits the advantage that the surface of the measuring needle, which the measuring beam impinges and/or an interposed optic element, can be embodied with regards to reflective features in the range of the wavelengths of the measuring beam such that in cooperation with the reflective features of the open optic resonator an optimal precision of measurement can be achieved. In this preferred embodiment the optic reflexivity of the object to be measured is therefore irrelevant, because the measuring beam is not impinging the object but the measuring needle or an optic element interposed.

Preferably the measurement is executed via the scanning force microscope in the so-called "high-speed AFM mode". In this measuring mode the measuring tip is guided over the object to be measured and based on the motion of the measuring tip conclusions are drawn about the surface quality. Such a measuring mode is known per se and for example described in "Experimental Observation of Contact Mode Cantilever Dynamics With Nanosecond Resolution", Payton et al. DOI: http://dx.doi.org/10.1063/1.3575321.

Accordingly, in a preferred embodiment of the method according to the invention the measuring beam of the optic resonator is not guided directly to the object to be measured but it detects the height motion of an AFM-measuring tip, which measuring tip preferably being operated in the fast-scan mode or the high-speed AFM-mode.

As described above, the operation of the measuring tip of a scanning force microscope in the fast-scan mode or the high-speed AMF mode is already known from prior art. However, here it is essential that the motion of the measuring tip is determined in which the measuring tip together with the open optic resonator of the device directly or indirectly forms an optic resonator and thus conclusions can be drawn from the interferometric measurement regarding the motion of the measuring tip.

Accordingly the invention further includes the use of a device according to the invention in order to directly or indirectly form an optic resonator via the surface of a measuring needle of a scanning force microscope.

BRIEF DESCRIPTION OF THE DRAWINGS

In the following, additional preferred features and embodiments of the device according to the invention and the method according to the invention are described based on the figures and exemplary embodiments. Shown are.

DETAILED DESCRIPTION OF THE PREFERRED EMBODIMENTS

Figure 1:
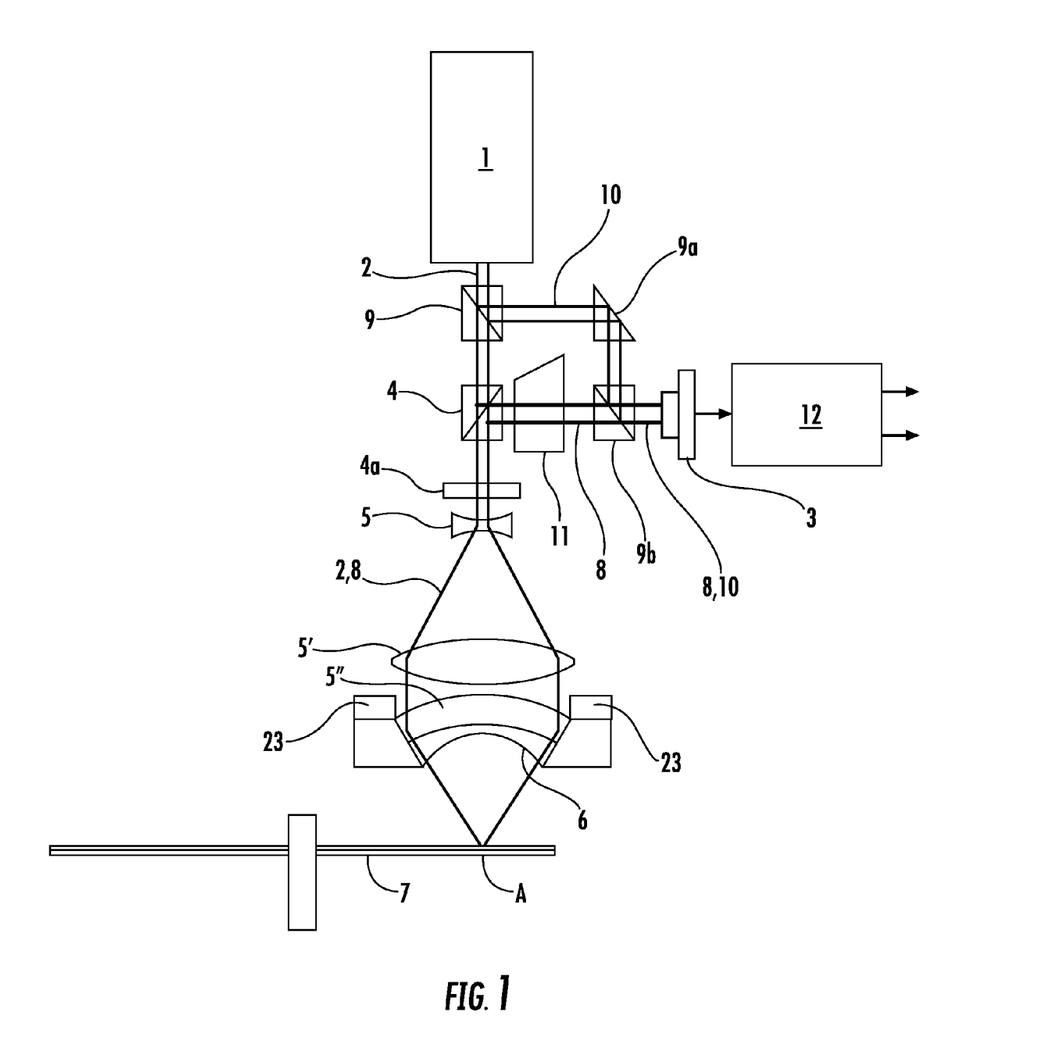
FIG. 1 an exemplary embodiment of a device according to the invention.

FIG. 1 shows a schematic illustration.

The exemplary embodiment of a device according to the invention shown for the interferometric measurement of an object comprises a radiation source 1, which is embodied as a laser. The laser is embodied as a DPSS-laser and generates an output beam 2 with a wavelength of 532 nm.

The device also comprises an interferometer as well as a detector 3, which is embodied as a photo-detector.

The exemplary embodiment of a device according to the invention for the interferometric measurement of an object additionally comprises a two-beam interferometer, which is embodied as a Mach-Zehnder interferometer. It comprises a beam splitter 9, which is arranged in the radiation path of the output beam 2 between the radiation source 1 and the beam splitter 4 embodied as a polarization beam splitter.

A reference beam 10 is split off the output beam 2 via the beam splitter 9. According to the common naming when describing a two-beam interferometer, the output beam 2, with at least a portion thereof passing the beam splitter 9 in a straight fashion, can therefor subsequently also be called the measuring beam.

The reference beam 10 is guided via a prism 9a and another beam splitter 9b to the detector 3.

The interference beam 8 is guided via the beam splitter 4 and the beam splitter 9b to the detector 3 as well. Thus, the reference beam 10 and the interference beam 8 are interfered on the detector 3.

The device additionally comprises a heterodyne design, in which furthermore a frequency shifting device 11, which is arranged in the radiation path of the interference beam 8 between the beam splitter 4 and the beam splitter 9b and embodied as a Bragg cell.

Thus it is possible with this device, using the evaluation unit 12, which comprises a demodulation unit in the form of an ARCTAN-demodulation, to determine both the amplitude as well as the phase of an electric field vector of the interference signal from the measuring data of the detector 3.

The device furthermore comprises an open optic resonator.

A beam splitter 4, which may be embodied as a polarization beam splitter, may be arranged in the radiation path of the output signal 2, which after passing the beam splitter 9 can be called the measuring beam. The output beam 2 passes the beam splitter 4 and subsequently impinges a polarization device 4a, which is embodied as λ/4-platelets. Via optic lenses 5, 5', 5" the output beam 2 is displayed on a resonator reflector 6. The lenses 5, 5', and 5" are embodied and arranged such that the light bundles perpendicularly impinge the surface of the resonator reflector 6.

Figure 2:
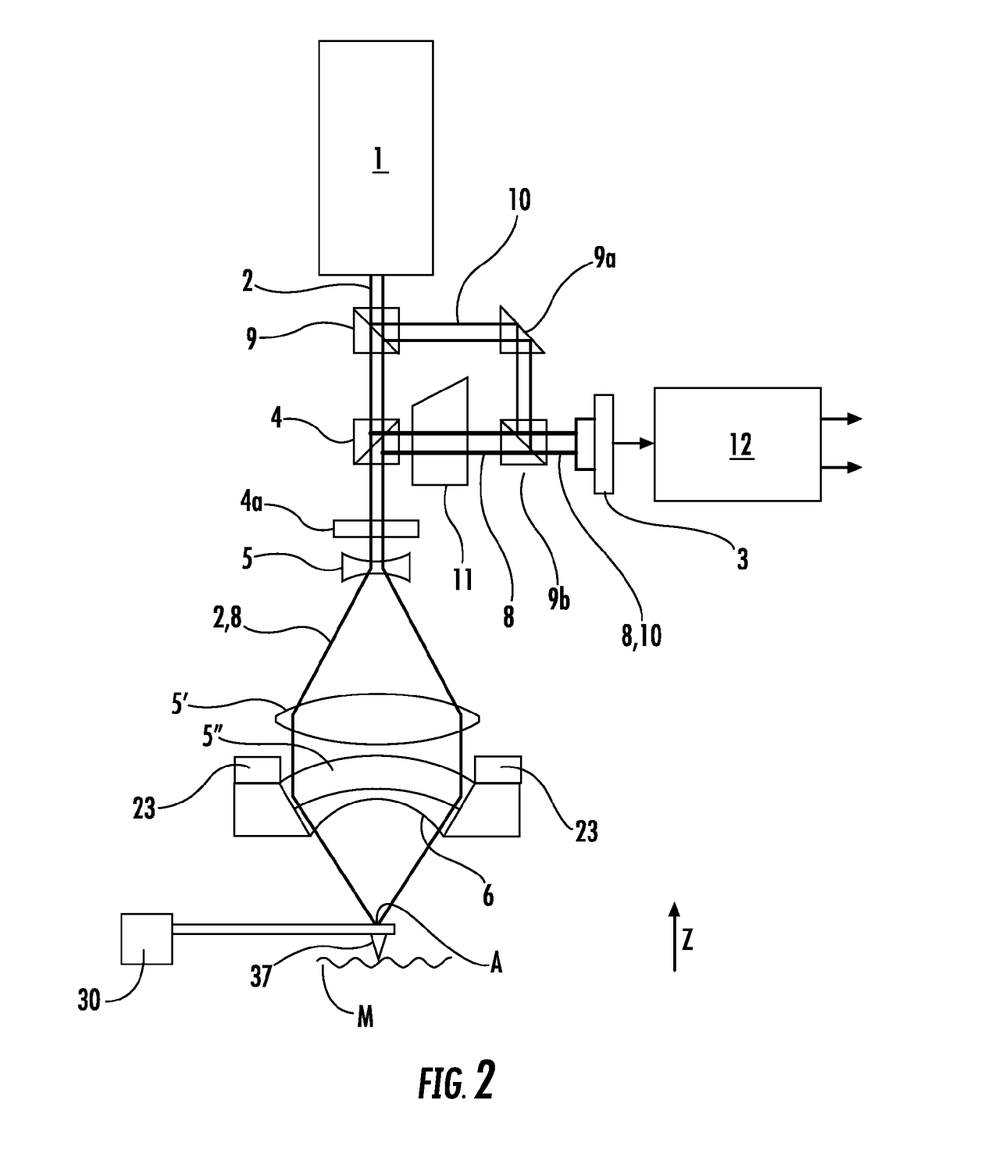
FIG. 2 an exemplary embodiment of a device according to the invention, with an optic resonator being formed together with the surface of a measuring needle of a scanning force microscope.

The output beam 2 impinges a measuring point A on an object 7 to be measured, which in FIGS. 1 and 2 represents a magnetic disk of a hard drive.

The side of the resonator reflector 6, facing the object 7, shows the form of a partially spherical surface, with the point A on the object to be measured being located in the center of the sphere of this partial spherical surface.

Together with the object 7 the resonator reflector 6 forms an optic resonator like a Fabry-Perot interferometer. The interferometer, comprising a beam splitter 4, a polarization device 4a, optic lenses 5, 5', 5", and the resonator reflector 6 thus are embodied as an open optic resonator.

Based on the embodiment of an optic resonator, an interference beam 8 is emitted from the resonator reflector 6, passes the optic lenses 5", 5', and 5, as well as the polarization device 4a, and due to the altered optic polarization it is deflected by the beam splitter 4 and the FIGS. 1 and 2 towards the right and thus impinges the detector 3.

The device comprises a control for the operating point for the automatic adjustment of the operating point of the interferometer. The control of the operating point comprises a frequency switch 20 with a low-frequency output 20a and a high-frequency output 20b. The high-frequency output is connected to an evaluation unit.

The low-frequency output 20a is connected to a control amplifier 21, with an off-set 22 being interposed between the frequency switch 20 and the control amplifier 21.

The control amplifier 21 is connected to a shifting unit 23.

By the shifting unit 23, which is embodied like Piezo-elements, the resonator reflector 6 can be moved up and down with the lens 5" in FIG. 1 so that via the shifting unit 23 the optic wavelength of the optic resonator can be influenced, which is embodied between the resonator reflector 6 and the object 7.

The control of the operating point occurs therefore such that the frequency switch 20, via the low-frequency output 20a, guides the low-frequency signal of the detector 3 to the control amplifier 21, if applicable via the off-set 22 after it had been added.

The control amplifier may for example represent a simple PID-control (P: proportional member, I: integral member, D: differential member). Depending on the definition of the algebraic sign and depending on the control and system parameters, due to the signals issued by the control amplifier to the shifting unit 23, the operating point of the device is kept constant within a certain control band width, in which depending on the signals applied at the shifting unit 23 the resonator reflector 6 and the lens 5" can be moved up or down.

Here, the above-mentioned control band width is selected such that all undesired disturbances are corrected. For example, if the ripples of the object 7 with ⅟₁₀ of the circumference shall be compensated, the control band width must amount to approximately 1000 Hz at an assumed circumferential speed of the object 7 totaling 6000 rpm. The frequency ratios must therefore be provided to the frequency switch at the low-frequency output 20a for the control. All shorter spatial wavelengths in the Azimuth-direction are forwarded by the frequency switch as high-frequency measuring signals to the HF-output 20*b*, and assessed by an appropriate evaluation unit.

The device further comprises the evaluation unit for assessing the measuring signals of the detector 3.

The control of the operating point is connected to the evaluation unit 12 and controls in a manner known per se the amplitude signal of the detector 3 on the flank of the transmission cure. The control occurs such that, as already described for FIG. 1, an appropriate control signal is guided to the shifting unit 23, which shifting unit 23 depending on the control signal moving the reference reflector 6 and the lens 5″ up or down so that the optic wavelength of the optic resonator is adjusted accordingly.

FIG. 2 also shows a schematic illustration. Similar to FIG. 1, the components with the same reference character also show the same or similar embodiments in the exemplary embodiment according to FIG. 2. In order to avoid repetitions, in the following the essential differences from FIG. 1 are discussed.

The exemplary embodiment according to FIG. 2 differs essentially from the exemplary embodiment according to FIG. 1 such that the output beam 2, as the measuring beam, not directly impinges the object M to be measured. The device according to FIG. 2 furthermore comprises an only schematically shown scanning force microscope 30, at which commonly a measuring tip 31 is arranged. The scanning force microscope 30 is here embodied to move the measuring tip 31 (also called "cantilever") in the high-speed AFM-mode over the surface of the object M to be measured. The motion of the measuring tip 31 in the Z-direction (see arrow according to FIG. 2), i.e. approximately perpendicular in reference to the surface of the object M to be measured, is however not assessed in a conventional fashion via the scanning force microscope but by way of the measuring beam 2 the surface of the measuring needle 31 impinging at a measuring point A facing away from the object M. This surface, impinged by the measuring beam 2, is embodied as an optic reflector in order to show high reflectivity at least in the range of the wavelengths of the measuring beam 2.

When now via the scanning force microscope 30 the measuring needle 31 is moved over the surface of the object M, in the manner described above the motion of the measuring needle 31 is evaluated in an interferometric fashion so that from the measurement data of the measuring needle 31 a surface topography of the surface of the object M is calculated.

For this purpose, a scanning measurement is performed in order to detect the entire surface of the object M or at least a detail of a predetermined partial area of the surface of the object M.

The measuring point A at the measuring needle 31 is aligned on the optic axis of the optic lenses 5″, 5′, and 5 in order to avoid measuring errors.

In the illustration according to FIG. 2 the measuring needle 31 is embodied as a cantilever. Here, other known embodiments are also included in the scope of the invention. For example, the measuring needle may be arranged at a rectangular, preferably square plate, which plate is connected at all corners via respectively a spring to a suspension. In general it is desired to arrange the measuring needle such that a motion is possible in the Z-direction however any tilting and/or rotation of the measuring needle about an axis perpendicular to the Z-axis is prevented to the extent possible.

The invention claimed is:

1. A device for the interferometric measuring of an object (7), comprising
    a radiation source (1) for generating an output beam (2), at least one beam splitter (9), and at least one detector (3),
    the beam splitter (9) arranged in a radiation path of the output beam (2) such that the output beam is split into at least one measuring beam (2′) and one reference beam (10),
    the reference beam being arranged to be interfered on the detector with an interference beam (8) in order to form an optic interference,
    an optically open resonator arranged in a radiation path of the device such that the measuring beam enters into the open optic resonator and the interference beam (8) emitted from the open optic resonator is interfered with the reference beam (10) on the detector (3) in order to form the optic interference.

2. The device according to claim 1, wherein the open optic resonator is embodied such that together with the object (7) to be measured an optic resonator is formed as a Fabry-Perot interferometer.

3. The device according to claim 1, wherein the open optic resonator comprises an optic resonator reflector (6), which is arranged in the radiation path of the output beam (2).

4. The device according to claim 3, wherein the interferometer comprises a second beam splitter (4), which is arranged in the radiation path of the output beam (2) between the radiation source (1) and the resonator reflector (6) and is embodied such that an interference beam (8) emitted from the resonator reflector (6) is deflected via the beam splitter (4) out of a radiation axis of the output beam (2).

5. The device according to claim 4, wherein the beam splitter (4) is embodied as a polarization beam splitter and an optic polarization device (4*a*) is arranged in at least one of the radiation path of the output beam splitter (2) or the interference beam (8).

6. The device according to claim 5, wherein the interferometer comprises a shifting device (23) for shifting the resonator reflector (6) in reference to the object, and the shifting device (23) comprises at least one Piezo element for shifting the resonator reflector (6).

7. The device according to claim 1, wherein the open optic resonator is embodied with an adjustable optic reflectivity at least in the range of the wavelength of the measuring beam, and the open optic resonator comprises a resonator reflector (6), with an optic reflectivity in reference to the object being embodied adjustable at least in the range of the wavelength of the measuring beam.

8. The device according to claim 1, further comprising a control of the operating point for the interferometer that is embodied to adjust the operating point depending on the measuring signals of the detector (3).

9. The device according to claim 8, wherein the control of the operating point is embodied at least one of: cooperating with the optic resonator such that the optic wavelength of the optic resonator is adjustable depending on the control signals of the control of the operating point, or cooperating with the radiation source (1) such that the optic wavelength of the output beam (2) is adjustable depending on the control signals of the control of the operating point.

10. The device according to claim 1, further comprising an evaluation unit for assessing measuring signals of the detector, said evaluation unit is configured to determine at least one of a speed of motion of the object/or a surface profile of the object (7) from the measuring signals of the detector (3).

11. The device according to claim 1, further comprising an evaluation unit (12) for assessing the measuring signals of the detector (3), said evaluation unit (12) is configured to determine at least one of an amplitude or a phase of an electric field vector of the interfered measuring and reference beams from the measuring signals of the detector (3).

12. The device according to claim 1, further comprising a heterodyne interferometer with a frequency shifting device (11) arranged in the radiation path of the reference beam or the interference beam.

13. The device according to claim 1, wherein the device is embodied as a scanning force microscope and for accepting a measuring tip, so that a surface of the measuring tip directly or indirectly forms an optic resonator together with the open optic resonator of the device.

14. A method for the interferometric measuring of an object (7), comprising the following processing steps:
    generating an output beam (2) via a light source (1);
    splitting the output beam into at least one measuring beam and one reference beam;
    interfering the reference beam and an interference beam on a detector in order to form an optic interference;
    the measuring beam entering an open optic resonator;
    forming an optic resonance between the open optic resonator and the object; and
    emitting the interference beam (8) from the open optic resonator and interfering the interference beam with the reference beam (10) on the detector (3) to form an optic interference.

15. The method according to one of claim 14, further comprising:
    Determining at least one of a phase or amplitude of an electric field vector of the measuring and interference beams interfered on the detector via the measuring signals of the detector (3) by demodulation.

16. The method according to claim 15, further comprising:
    changing an optic reflectivity of the open optic resonator such that the optic reflectivity of the open optic resonator is greater than the optic reflectivity of a measuring range to be measured on the object.

17. The method according to claim 16, further comprising:
    the measuring beam of the open optic resonator not directly impinging the measuring object and detecting a height motion of an AFM-measuring tip which is operated in a fast-scan mode or a high-speed AFM mode.

18. The method of claim 16, wherein the method is carried out using the device of claim 1 in order to directly or indirectly form an optic resonator via a surface of a measuring needle of a scanning force microscope.

19. The device according to claim 5, wherein the optic polarization device (4a) is a $\lambda/4$-platelet.

20. The device according to claim 5, wherein the polarization device (4a) is arranged in the radiation path of the interference beam (8) between the polarization beam splitter (4) and the resonator reflector (6).

* * * * *